United States Patent Office 3,769,351
Patented Oct. 30, 1973

3,769,351
PROCESS FOR PRODUCING BIS-ALPHA-METHYLBENZYL ETHER
Yoku Mukai, Ikoma-gun, Nara-ken, Japan, assignor to Kyoeisha Yushi Kagaku Kogyo Co., Ltd., Osaka, Japan
No Drawing. Filed Apr. 14, 1971, Ser. No. 134,047
Claims priority, application Japan, Apr. 20, 1970, 45/33,014
Int. Cl. C07c 41/10
U.S. Cl. 260—611 A    5 Claims

ABSTRACT OF THE DISCLOSURE

Bis-alpha-methylbenzyl ether is produced by reacting two molecules of alpha-methylbenzyl alcohol with each other in the presence of a silicofluoride catalyst at elevated temperature.

This invention relates to a process for producing bis-alpha-methylbenzyl ether, and more particularly, relates to a process for producing bis-alpha-methylbenzyl ether from alpha-methylbenzyl alcohol according to the following formula:

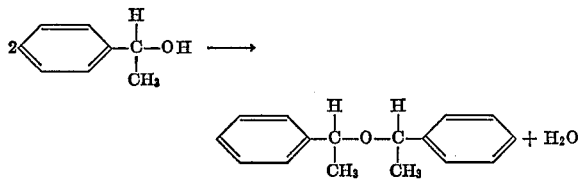

A process for producing bis-alpha-methylbenzyl ether from alpha-methylbenzyl alcohol in the presence of a mineral acid catalyst, such as sulphuric acid or phoshoric acid is known. However, many difficulties exist in carrying out the process on a commercial basis.

I have found that catalytically active silicofluorides give rise to a reaction in which the reaction ratio (the mole ratio of reacted alpha-methylbenzyl alcohol to the feedstock alpha-methylbenzyl alcohol) and the selectivity of bis-alpha-methylbenzyl ether are large, the chance for formation of a by-product is small, and the bis-alpha-methylbenzyl ether formed is not coloured.

A silicofluoride compound capable of being used in this invention is represented by the general formula:

$$B_m(SiF_6)_{n'}$$

[wherein each of $m$ and $n'$ is an integer from 1 to 4; and B is hydrogen, a metal selected from the group consisting of Cu, Mg, Ca, Zn, Cd, Al, In, Sn, Pb, V, As, Sb, Cr, Mo, Mn, Fe, Co and Ni; ammonium; RR'R''NH (wherein R is an alkyl group having 1 to 18 carbon atoms, an allyl group, a hydroxyethyl group, a hydropropyl group, and each of R' and R'' is hydrogen, an alkyl group having 1 to 18 carbon atoms, an allyl group, a hydroxyethyl group or a hydroxypropyl group); pyridinium; picolinium; or piperidinium].

These catalysts are used generally in the form of an aqueous solution. The concentration of the aqueous solution is optional. These catalysts can be used alone or in the form of a mixture thereof.

The above catalysts can be produced by adding hydrogen silicofluoride to a metal oxide, a metal hydroxide, an aqeuous ammonia solution or an amine. The molar ratio of the former to the latter is in the range between 1:1–1:2.

The amount of the silicofluoride compound catalyst to be used is 0.1–10 mol percent to the charged alpha-methylbenzyl alcohol, preferably 0.1–1 mol percent.

The catalyst may be charged into a reactor, together with alpha-methylbenzyl alcohol, or alpha-methylbenzyl alcohol may be charged into a reactor, followed by gradually adding the catalyst to the reactor with stirring. Alternatively, both the catalyst and alpha-methylbenzyl alcohol may gradually be charged into a reactor with stirring.

The etherification temperature of this invention is in the range of 100–200° C., preferably 120–140° C. Within this temperature range, the molar ratio of the formed bis-alpha-methylbenzyl ether to the reacted alpha-methylbenzyl alcohol is more than 95%.

If the material to be reacted is heated for a longer time, by-products, such as styrene and distyrene are prone to be formed.

The etherification reaction may be carried out in the presence or absence of an inert solvent, such as benzene, toluene or xylenes. Water formed during the reaction is distilled off as an azetropic mixture with the solvent and its removal is also facilitated by introducing an inert gas, such as a nitrogen gas into the reaction system.

When the reaction is completed, the reaction catalyst is neutralized and thereby converted to an inert compound which is filtered off. The neutralizing agent may be aqueous solution of sodium hydroxide or ammonia. Anhydrous sodium bicarbonate and sodium carbonate are preferred. The amount of the neutralizing agent to be added should be slightly above the equivalent of the catalyst. The neutralizing process is important, because the catalyst also promotes decomposition of bis-alpha-methylbenzyl ether during distillation in the subsequent refining process.

This invention is illustrated by the following examples. All parts and percent are based on weight. The reaction ratio and the selectivity are calculated from analysis by Gas Chromatography.

Into a 500 ml.-four-necked flask equipped with an agitator, a thermometer, a condenser having a water-measuring tube and a feeder for nitrogen gas was charged 244 parts of alpha-methylbenzyl alcohol in each of a series of experiments. Then, 1 ml. of one of the catalysts listed in the following table was added thereto with stirring, and the mixture was heated at 130° C. in a nitrogen atmosphere for 180 minutes, and then cooled to 50° C., whereupon the introduction of nitrogen gas was discontinued. Thereafter, 2 parts of anhydrous sodium carbonate were added, and the mixture was agitated for further 30 minutes, and the reaction product was suction-filtered. The filtrate was analyzed by gas chromatography, and the reaction ratio of alpha-methylbenzyl alcohol and the selectivity of bis-alpha-methylbenzyl ether formation were calculated (refer to table). The reaction product was rectified at 3 mm. Hg to obtain the desired product having a boiling point of 120° C./3 mm. H, $d_{20}^{20}=1.004$ and $n_D^{25}=1.539$.

TABLE

| Catalyst | Amount of Catalyst (cc.) | Dehydration (cc.) | Reaction Time (hrs.) | Ratio percent | Selectivity, percent |
|---|---|---|---|---|---|
| 40% aqueous solution of $H_2SiF_6$ | 2 | 13 | 4 | 96 | 90 |
| Saturated aqueous solution of $ZnSiF_6$ | 5 | 16 | 4 | 90 | 93 |
| Saturated aqueous solution of $MgSiF_6$ | 4 | 14.5 | 4 | 90 | 92 |
| Saturated aqueous solution of $CuSiF_6$ | 5 | 14 | 5 | 96 | 94 |
| Saturated aqueous solution of $PbSiF_6$ | 5 | 16 | 2 | 96 | 94 |
| Mixture of 40% aqueous solution of $(NH_4)_2SiF_6$ with 40% aqueous solution of $H_2SiF_6$ (1:1) | 4 | 12 | 5 | 95 | 93 |
| Mixture of saturated aqueous solution of $BaSiF_6$ with 40% aqueous solution of $H_2SiF_6$ (1:1) | 4 | 15.5 | 4 | 95 | 93 |
| Saturated aqueous solution of $FeSiF_6$ | 5 | 16 | 3 | 92 | 90 |
| Saturated aqueous solution of $AlSiF_6$ | 5 | 15 | 6 | 92 | 92 |
| Saturated aqueous solution of $CrSiF_6$ | 5 | 14 | 6 | 92 | 93 |
| Saturated aqueous solution of $SbSiF_6$ | 5 | 14 | 5 | 94 | 92 |
| 45% aqueous solution of $SnSiF_6$ | 4 | 14 | 6 | 90 | 90 |
| Saturated aqueous solution of $MnSiF_6$ | 5 | 14 | 6 | 90 | 94 |
| 40% aqueous solution of $CdSiF_6$ | 4 | 16 | 6 | 94 | 92 |
| Salt of 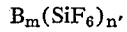—$N(C_2H_4OH)_2H_2SiF_6$ | 4 | 16 | 6 | 95 | 92 |
| Salt of $(C_2H_4OH)_3H_2SiF_6$ | 4 | 14 | 6 | 90 | 92 |

The amount of dehydration means the combined amount of the theoretical amount of dehydration and the amount of water contained in the aqueous solution of catalyst. Since water is lost during the reaction, the amount of dehydration does not correspond to the reaction ratio. In order to realize the approximate reaction ratio, the thus dehydrated amount is shown in the table. If it is in excess of the theoretical amount, a side-reaction is assumed to occur.

I claim:

1. A process for producing bis-alpha-methylbenzyl ether which comprises:
   (a) holding α-methylbenzyl alcohol at a temperature of 100° to 200° C. in contact with an effective amount of a catalyst until said ether is formed by reaction of two molecules of said α-methylbenzyl alcohol with each other; and
   (b) recovering the ether formed,
   (c) said catalyst being a silicofluoride of the formula
   $$B_m(SiF_6)_{n'}$$
   wherein $m$ and $n'$ are integers between 1 and 4, and B is selected from the group consisting of (a), (b), (c), (d), (e), (f) and (g) wherein (a) is hydrogen; (b) is a metal selected from the group consisting of Cu, Mg, Ca, Zn, Cd, Al, In, Sn, Pb, V, As, Sb, Cr, Mo, Mn, Fe, Co and Ni; (c) is ammonium; (d) is pyridinium, (e) is picolinium; (f) is piperidinium; (g) is RR′R″NH, R being alkyl having 1 to 18 carbon atoms, allyl, hydroxyethyl, or hydroxyproplyl, nad R′, R″ being members of the group consisting of hydrogen, alkyl having 1 to 18 carbon atoms, allyl, hydroxyethyl, and hydroxypropyl, said amount being 0.1 to 10 mole percent of said alcohol.

2. The process according to claim 1 wherein the amount of the silicofluoride is 0.1–1 mol percent of the alpha-methylbenzyl alcohol.

3. The process according to claim 1 wherein said temperature is 120–140° C.

4. The process according to claim 1 wherein said reaction is carried out in an inert solvent.

5. The process according to claim 4 wherein said inert solvent is selected from the group consisting of benzene, toluene and xylene.

References Cited

UNITED STATES PATENTS

| | | | |
|---|---|---|---|
| 2,863,925 | 12/1958 | Starcher | 260—611 A |
| 2,366,203 | 1/1945 | Livak | 260—611 A |
| 2,927,064 | 3/1960 | Lvzader et al. | 260—611 A X |
| 2,723,261 | 11/1955 | Levine et al. | 260—611 A X |

OTHER REFERENCES

Mikhalev et al.: Chem. Abs., vol. 55 (1961), 3524.

Remy: Treatise on Inorganic Chemistry (1956), pp. 484–485.

Olah: Friedel Crafts and Related Reactions, vol. 1 (1963), pp. 256–257.

BERNARD HELFIN, Primary Examiner

U.S. Cl. X.R.

252—441, 429, 438